United States Patent [19]

Finke

[11] Patent Number: 4,828,483
[45] Date of Patent: May 9, 1989

[54] METHOD AND APPARATUS FOR SUPPRESSING NOX FORMATION IN REGENERATIVE BURNERS

[75] Inventor: Harry P. Finke, Pittsburgh, Pa.

[73] Assignee: Bloom Engineering Company, Inc., Pittsburgh, Pa.

[21] Appl. No.: 198,739

[22] Filed: May 25, 1988

[51] Int. Cl.⁴ .................. F23D 11/44; F27D 17/00
[52] U.S. Cl. ........................... 431/11; 431/181; 431/215; 432/28; 432/180
[58] Field of Search ............. 431/11, 5, 207, 328, 431/181, 215; 165/4; 432/28, 181, 182, 180

[56] References Cited

U.S. PATENT DOCUMENTS 3,994,665  11/1976  Young ........................... 431/11 X
4,522,588   6/1985  Todd et al. ..................... 432/219 X
4,740,154   4/1988  Cantoni .......................... 431/11 X Primary Examiner—Randall L. Green
Attorney, Agent, or Firm—Webb, Burden, Ziesenheim & Webb

[57] ABSTRACT

A method and apparatus for repressing NOx formation in twinned regenerative burner pairs includes inducing a stream of hot flue gas, preferably containing enriched products of combustion, from the main hot flue gas exhaust stream and vitiating the preheated combustion air with the hot flue gas in the firing burner. An interconnecting duct communicating with the twinned burner pair includes a coaxial gas nozzle for injecting a high kinetic energy gas stream into the exhausting hot flue gas to induce a portion of the hot flue gas into the interconnecting duct to pass the hot flue gas to the firing burner for vitiation purposes.

19 Claims, 3 Drawing Sheets

4,828,483

METHOD AND APPARATUS FOR SUPPRESSING NOX FORMATION IN REGENERATIVE BURNERS

BACKGROUND OF THE INVENTION

The invention relates to generally regenerative type burners for heating a furnace, and more particularly to regenerative burners with minimized NOx formation in the ultimate combustion effluents. This invention is related to co-pending application Ser. No. 168,892 entitled "Low NOx Regenerative Burner" filed Mar. 16, 1988, the contents of which are incorporated by reference herein.

Regenerative-type burners for furnaces are well-known in the art in varied forms and designs, but they share the common feature whereby heat storage units are provided to withdraw and store heat from hot combustion effluents known as flue gas, with subsequent transfer of the heat to preheat incoming combustion air. The earliest regenerative-type furnaces were symmetrical arrangements having both burner(s) and heat storage units (often solid structural arrays of "checker chamber" bricks) in place on each of two sides of the furnace. Firing of such a regenerative furnace began with the burner(s) on one side, with concomitant storage of the heat present in the combustion effluents by the heat storage units on the second side. After optimal heating of the heat storage units, or the "checker chamber," the air flow in the furnace was reversed to draw combustion air in through the checker chamber, thus preheating the combustion air. Ducts in the checker chamber thus alternately conveyed combustion products and combustion air, and the burners functioned alternately as burners and as flues.

Modern regenerative systems do not involve complete symmetrical furnaces but instead include specialized regenerative burners employed, typically, in pairs. Each of the paired regenerative burners is equipped with heat storage units, ordinarily in the form of compact regenerative beds, through which combustion air passes en route to the burner. Because the burners are employed in pairs, one burner is fired at a time while the other functions as a flue and heat storage bed. Then every 20–120 seconds or so, flow in the furnace is reversed and the burners "exchange" functions, that is, the first-fired burner becomes the flue gas exhaust/heat storage bed as the second burner fires. A system exemplary of one paired burner arrangement is found in U.S. Pat. No. 4,522,588.

A persistent problem with regenerative systems involves the extremely high NOx concentrations inevitably present in the combustion effluents, produced as a result of the extremely high air preheats and flame temperatures, as well as through fuel bound nitrogen. As a result, regenerative systems which historically enjoyed industry-wide acceptance now cannot meet the emissions standards in an ever-increasing number of localities and/or process conditions. There is a need for low NOx burner concepts which can be broadly adapted to the specific applications by altering the flame temperature to meet NOx emission requirements. A need therefore persists for regenerative burner systems which provide the heat-regenerative function of prior art systems yet provide for significant NOx reduction.

SUMMARY OF THE INVENTION

Briefly stated, the present invention comprises a paired heat regenerative burner system suitable for direct firing into a furnace or for use on an enclosed radiant tube burner assembly. The burner pair includes two identical right and left burner units which individually and alternately operate in a heating (firing) or exhaust/heat reclaiming mode. For ease of description herein the right hand burner will be assumed to be in the firing mode and the left hand burner in the regenerative mode. Each of the burners have chambers which are connected at a respective combustion end to a spaced pair of first ducts which communicate with the interior of the furnace or to the tube of a U-shaped radiant tube burner and alternately act to emit hot combustion gases into the furnace or to exhaust hot flue gases from the furnace. Each of the burners have a heat regenerator media bed associated therewith which are respectively connected to a combustion air inlet duct/flue gas outlet duct. A vitiation duct interconnects the two burners on the furnace side of the regenerative media beds and communicates with the interior chamber portion of each burner. A nozzle is positioned at each of the burner chambers to alternately inject a high velocity gas stream into the interconnecting duct. The high velocity stream entrains a portion of the flue gas containing hot products of combustion ("POC") exiting the furnace at the left bank burner and causes the entrained hot flue gas to vitiate the preheated combustion air in the right hand burner chamber. The balance of the hot flue gases pass through the left bank regenerative media bed to transfer its heat thereto for later transfer to a reverse flowing stream of combustion air (when the left bank is in the firing mode). A fuel nozzle or other injector means introduces a fuel stream to the mixture of hot POC containing flue gas and preheated combustion air at the right bank burner chamber whereby suppressed or reduced NOx formation in the burner flame is obtained. The regenerator sizing is significantly reduced while cycle efficiency is also increased due to the fact that the preheat combustion air is vitiated with a hot POC containing flue gas at very high temperatures, for example, between about 1800° to 2000° F. The lowered oxygen content of the vitiated combustion air lowers flame temperatures and minimizes NOx formation while the high BTU content of the hot vitiating POC containing flue gas contributes to higher furnace efficiencies.

In one preferred form of the invention, the injected stream of gas is injected tangentially relative to the stream of hot flue gas exiting the furnace to impart a swirling motion to the flue gas to create an enriched layer of POC which is then entrained in the vitiating stream.

DETAILED DESCRIPTION OF THE INVENTION

Figure 1:
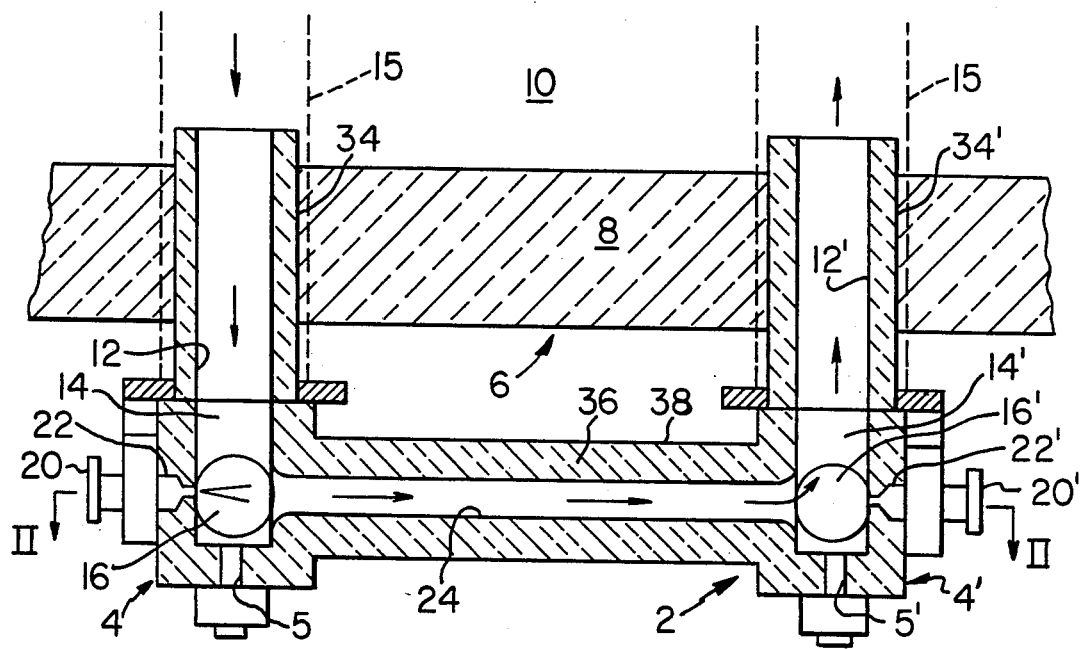
FIG. 1 is a schematic plan view of a twinned heat regenerative burner system according to the present invention.
Figure 2:
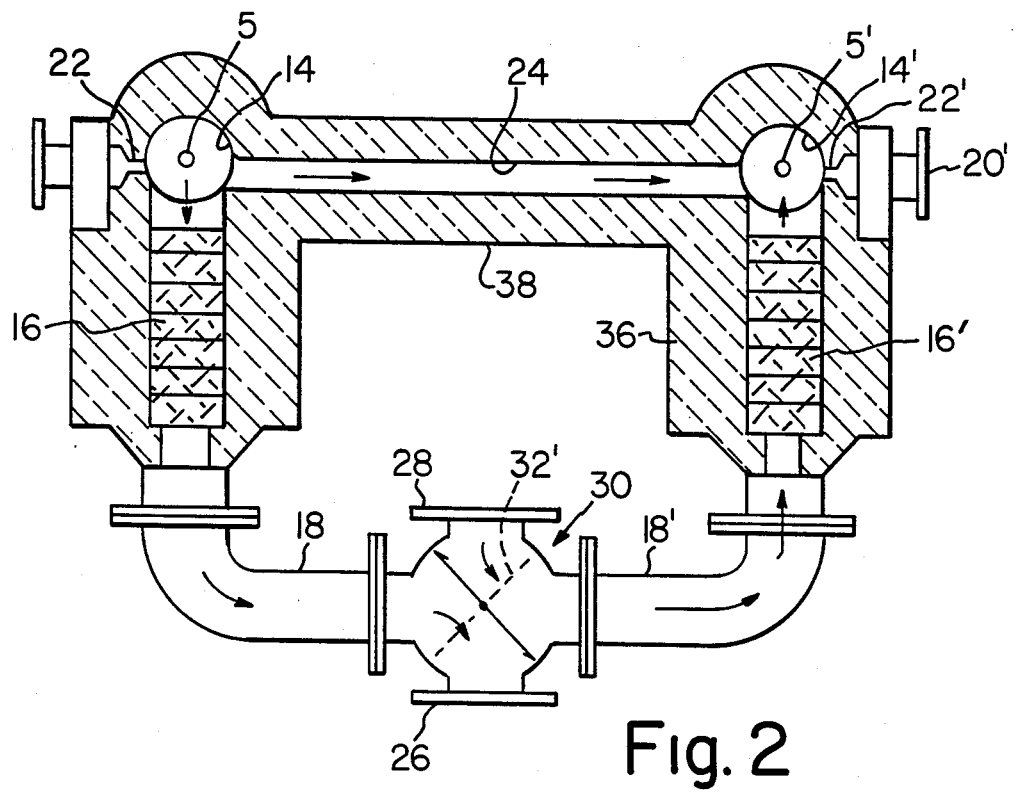
FIG. 2 is a schematic view in front elevation of the embodiment of the invention depicted in FIG. 1.

Reference is now made to the drawings in which identical elements are designated by identical reference numerals throughout the various figures and mirror images of the same elements are designated by primed numerals. In FIGS. 1-2, a left bank of a regenerative burner 4 is shown, with an identical right bank mirror image, identified in primed numbers. The right bank burner system is generally designated by reference numeral 4'. The left and right regenerative burner pair 4 and 4' is mounted within a wall 8 of a furnace 6 for supplying heat to the interior chamber 10 thereof. The left bank and right bank burners 4, 4' are adapted to alternately fire combustion products directly into the furnace chamber 10 as shown in the drawings. The invention is also suitable for use in connection with an alternately fired, continuous U-shaped, radiant tube regenerative burner system, the radiant tube partially shown in phantom lines and designated by reference numeral 15 in FIG. 1. In both instances, i.e., direct fired and radiant tube fired, the invention provides a self-vitiating low NOx regenerative burner pair. As appreciated in the art, a regenerative type burner is significantly more efficient in recovering waste heat from hot flue gases than the common recuperator style preheaters previously used in connection with radiant tube burners.

Figure 5:
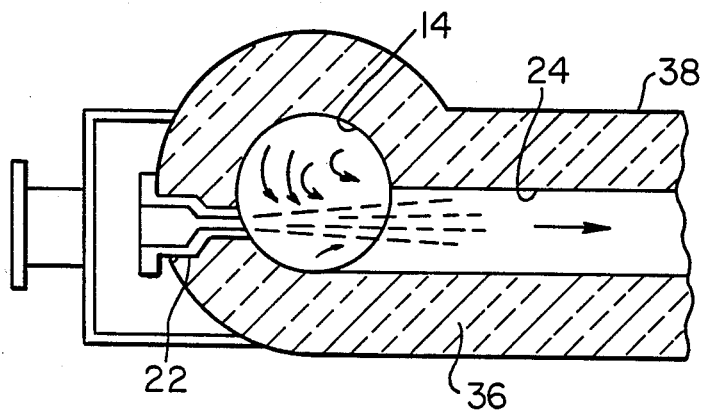
FIG. 5 is a partial cross-sectional view of the gas injector left bank burner chamber and interconnecting duct taken along line V—V of FIG. 3.

In the firing mode of operation shown in FIGS. 1 and 2, hot flue gases containing products of combustion ("POC") leave the furnace interior 10 under the influence of a forced or induced draft initiated by a remotely located fan means (not shown) and exit via a first duct 12 to then enter a burner chamber 14 of the burner 4 which is in a non-firing, exhaust mode. A medium pressure or a high pressure energy source, which may include air, POC or gaseous fuel, is pumped through a feed conduit 20 and discharged preferably at a high velocity through a nozzle 22, communicating therewith, into the burner chamber 14. The nozzle 22 is aligned co-axially with the longitudinal axis of an interconnecting duct 24. Duct 24 communicates at its ends with the burner chambers 14 and 14' of the spaced-apart left and right bank burners 4 and 4', respectively. The interconnecting duct 24 is preferably tangentially offset from the sidewalls of burner chambers 14 and 14' as shown in FIGS. 2 and 5. The high velocity gas stream which is emitted from the nozzle 22 creates an induction of a portion of the hot flue gas entering the chamber 14. The portion of hot flue gas so induced is entrained into the high velocity gas stream and passes through the interconnecting duct 24. A high kinetic energy is imparted to the gas stream exiting the nozzle 22 which is sufficient to move the subject gas stream and its entrained portion of flue gas from the left burner bank 4 to the right burner bank 4' via interconnecting duct 24, without the need for any auxiliary fans or blowers.

The major portion of the hot flue gas which exhausts from the furnace 6 at first duct 12 and enters the chamber 14, passes downwardly through a left heat storage bed or regenerator 16, of known construction, which extracts the sensible heat from the flue gas and stores the heat for later preheating of combustion air when the firing cycle is reversed. As best seen in FIG. 2, cooled flue gas leaves the regenerator bed 16 by way of a duct 18, and is exhausted through a port 26 of a valve assembly 30. A rotatable valve plate 32 directs the cooled flue gas to the exhaust port 26 of valve 30 and simultaneously introduces cool combustion air therein by way of a port 28. The combustion air port 28 may be opened directly to the atmosphere, in a negative draft mode, or it may be connected to a positive pressure, fan driven system, all in a known manner. The cool combustion air passes through the valve 30 and enters a duct 18' whereupon it is passed upwardly through a previously heated regenerator bed 16'. Stored heat in the regenerator bed 16' is given up to preheat the incoming combustion air which then enters the right hand burner bank 4' at chamber 14'. The high velocity gas stream from nozzle 22 and its entrained hot flue gas, exiting interconnecting duct 24, enters the burner chamber 14' and mixes with the preheated combustion air therein to vitiate or dilute the combustion air stream by lowering the oxygen level thereof. The degree of vitiation to be achieved is controlled by the mass and velocity of the high velocity gas stream introduced through the feed conduit 20 and nozzle 22. By way of example, vitiation of the combustion air stream is controllable within a range of between about 15% to about 21% as measured in the mixed air and gas stream exiting the burner chamber 14' of the right bank burner 4'.

During the firing mode shown in the drawings, a fuel is introduced through a fuel conduit 5' positioned within the right bank burner 4'. A small quantity of ambient bled air or POC is preferably passed through feed conduit 20' and nozzle 22' during the right hand firing mode in order to cool those components. Simultaneously, when in the right bank firing mode, the left bank fuel conduit 5 is also preferably cooled by a small flow of ambient purge air or POC therethrough.

Primary combustion is initiated in the burner chamber 14' of the right bank burner 4' and propagates through the duct 12' into a combustion chamber which can be the open interior 10 of the furnace or the interior of the radiant tube 15 connected to the duct 12'. A layer of refractory insulation 34, 34' envelopes the ducts 12, 12' to protect the support structure 8 or the radiant tube 15 from the high heat of combustion generated, within the ducts 12 and 12'. A layer of insulation 36 is also preferably applied around the burner banks 4, 4', regenerator beds 16, 16', and interconnecting duct 24, to minimize heat losses. An outer protective metal surface 38 is also applied to protect the insulation layer 36 against inadvertent damage.

The right hand firing mode cycle is completed as the flue gases containing POC exit the furnace 6 through the combustion chamber of first duct 12 on the left burner bank 4. As previously described, a portion of these flue gases are induced into the interconnecting duct 24 with the balance passing through the heat regenerator bed 16. The cooled flue gas is vented to a wsste stack communicating with exhaust port 26 which is either connected to a suction provided by a negative draft system or vented to the stack when the combustion air port 28 is under the influence of a positive pressure air supply system.

After a given period of time elapses, the firing direction is reversed from the right hand mode shown to a left hand mode. The direction of combustion air and flue gas wthin the ducts 18, 18' and 24, as well as in the combustion/exhaust ducts 12, 12', is reversed from that shown in FIGS. 1 and 2. When the left bank burner 4 is in the firing mode, the valve plate 32 is rotated to the position indicated by phantom lines 32', which directs the cool combustion air upwardly through duct 18 for preheating in regenerator bed 16. In this mode, valve plate 32' concurrently directs the cooled flue gas now exiting from duct 18, to the waste stack via the exhaust port 26.

Figure 3:
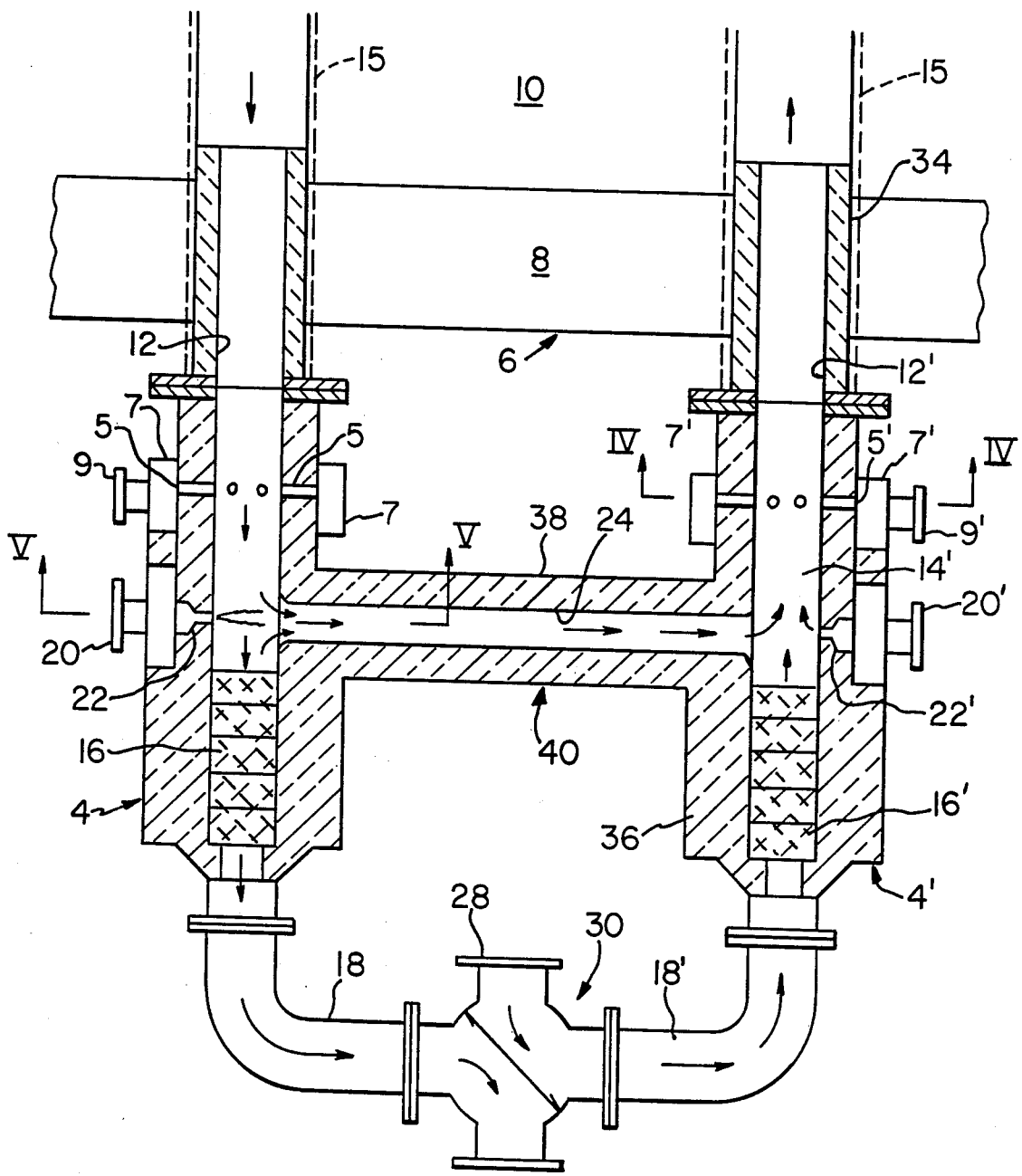
FIG. 3 is a schematic plan view a further embodiment of the present invention in the form of twined burners having a modified form of fuel delivery.
Figure 4:
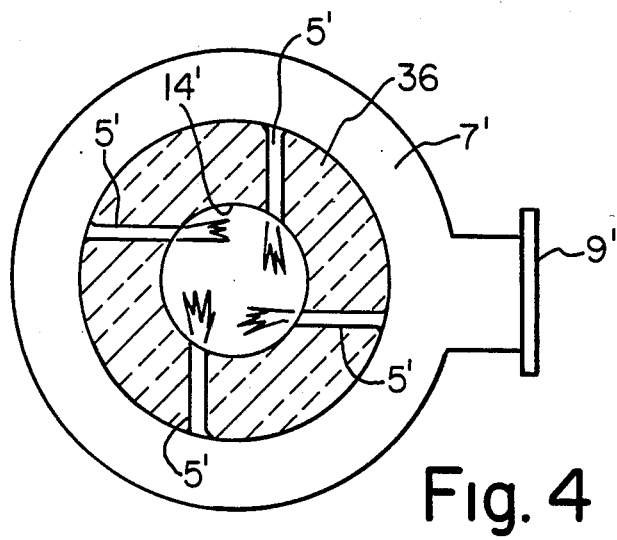
FIG. 4 is a cross-sectional view of the fuel injector manifold taken along lines IV—IV of FIG. 3.

A slightly modified apparatus 40 embodying the principals of the present invention is depicted in FIGS. 3-5. The apparatus 40 operates generally in the same manner as described, with the exception that the fuel stream is introduced tangentially into the swirling stream of flue gases exiting from the interconnecting duct 24. As seen in FIG. 5, the high velocity gaseous jet from nozzle 22 induces a flow of a portion of the flue gas from chamber 14 into the interconnecting duct 24. The tangential offset of the duct 24 with the sidewall of chamber 14 and co-axial alignment of nozzle 22 with duct 24 creates a swirling motion in the flue gas within chamber 14 which provides an outer layer of highly enriched hot POC which is induced to pass into the duct 24 by the high velocity gas stream from nozzle 22. This swirling POC enrichment feature is also achieved in the embodiment of FIGS. 1-2. As seen in FIG. 4, a plurality of fuel conduits 5' supply a plurality of fuel streams tangentially to the chamber 14' to also impart a desired swirling motion to the combustion mixture. The fuel is supplied to the conduits 5' by way of an inlet duct 9' and a communicating, annular manifold 7' which surrounds the burner chamber 14'.

The advantages of the present invention are readily appreciated by those skilled in the art in that the flue gas/POC which is recirculated back into the combustion process to vitiate the combustion air is at a temperature approximately equal to the gases exiting the furnace chamber. As a consequence, the sizing of regenerator 16, 16' can be significantly smaller than if vitiation were used on the stream entering the regenerator. In addition, the cycle efficiency when compared to using vitiated air directly into the regenerator is increased due to the fact that the self-vitiating flue gas/POC stream is already at temperatures between about 1800° to 2000° F. when injected into the burner chambers 14, 14'. These obvious economic advantages are achieved while the desired ecological goal of NOx suppression is also realized.

Although the invention has been described in connection with specific materials and specific embodiments, the invention is to be limited only insofar as is set forth in the accompanying claims.

What is claimed is:

1. A method of repressing NOx formation in a regenerative type burner operably connected to a furnace comprising the step of:
   heating a regenerative bed with hot flue gas withdrawn from the furnace;
   preheating a combustion air stream in the heated regenerative bed;
   passing the preheated combustion air stream to said burner;
   withdrawing a portion of hot flue gas from the furnace and passing said portion to said burner; and
   vitiating the preheated combustion air stream with said hot flue gas.

2. A method of repressing NOx formation in a twinned pair of regenerative burners of the type having heat regeneration beds associated therewith for alternately withdrawing heat from a flue gas exiting a furnace and heating a combustion air stream being fed therethrough, comprising the steps of:
   withdrawing a stream of hot flue gas from the furnace;
   injecting a stream of gas into said flue gas stream;
   entraining a portion of said hot flue gas within said injected gas stream;
   passing said stream of injected gas and said entrained portion of hot flue gas to a burner chamber; and
   vitiating a combustion process in said burner chamber with said portion of hot flue gas whereby NOx formation is repressed.

3. The method of claim 2 wherein the injecting step is cyclically alternated between a first and second of the paired burners in accordance with a selected firing and exhaust cycle of said burners.

4. The method of claim 2 wherein the injected gas stream is one selected from the group consisting of air, flue gas containing products of combustion, gaseous fuel, and mixtures of two or more thereof.

5. The method of claim 2 including the step of aligning the injected gas stream in a tangential direction relative to said hot flue gas stream whereby a swirling motion is imparted to the flue gas to create an enriched layer of products of combustion in said hot flue gas for entraining in said injected gas stream.

6. The method according to claim 2 wherein the twinned pair of burners are of the type that fire directly into the furnace.

7. The method according to claim 2 wherein the twinned pair of burners are of the radiant tube type.

8. The method according to claim 2 wherein the injected gas stream is flue gas containing products of combustion.

9. A method of operating a heat regenerative burner pair operably connected to a furnace, comprising the steps of:
   a. withdrawing a stream of hot flue gas from the furnace;
   b. inducing a portion of the hot flue gas to flow to a first of said burner pair when said first burner is in a firing mode;
   c. flowing a balance of said hot flue gas through a first regenerative bed associated with the second of said burner pair when said second burner is in an exhaust mode;
   d. Preheating a combustion air stream in a second regenerative bed associated with said first burner;
   e. vitiating said preheated combustion air with said portion of said induced portion of hot flue gas in said first burner;
   f. whereby upon introduction of a fuel, a resulting combustion process taking place contains a repressed NOx level; and
   cycling said process steps of a-f to said second burner wherein said second burner is in a firing mode and said first burner is in an exhaust mode.

10. The method of claim 9 wherein said inducing steps comprises injecting a high velocity gas stream tangentially into said hot flue gas stream whereby said injected stream possesses sufficient kinetic energy to flow to said firing burner.

11. The method of claim 10 wherein the injected high velocity gas stream is one selected from the group consisting of air, flue gas, gaseous fuel and mixtures of two or more thereof.

12. The method of claim 10 wherein the injected high velocity gas stream is flue gas.

13. An improved regenerative burner apparatus of the type comprising a pair of first and second spaced-apart burners, each of said burners comprising a chamber for mixing a fuel and a stream of preheated combustion air supplied from a regenerative heat storage bed associated with each of said burners, said burners adapted to operate cyclically wherein a first of said burners is in a firing mode directing hot gases into a furnace interior while a flue gas stream exits the furnace and passes through the second burner chamber and then passes to the regenerative heat storage bed associated therewith said second burner, wherein the improvement comprises, an interconnecting duct communicating with the chambers of said first and second burners; and nozzle means adapted to inject a gas stream for inducing a flow of a portion of the hot flue gas exiting the furnace into said interconnecting duct to enter the burner in the firing mode to vitiate the combustion air therein, whereby NOx formation is repressed.

14. The regenerative burner apparatus of claim 13 wherein the nozzle means includes a nozzle associated with each of said burner chambers each nozzle having an orifice aligned substantially co-axially with said interconnecting duct.

15. The apparatus of claim 14 wherein the interconnecting duct is aligned tangentially relative to each of said burner chambers to impart a swirling motion in said hot flue gas whereby a layer of highly enriched products of combustion gas is entrained in said gas stream.

16. The apparatus of claim 13 wherein each of said burner chambers includes a plurality of fuel inlet nozzles arranged tangentially relative to a bore of said chamber whereby a swirling motion is imparted to gases flowing therein to improve mix of the fuel, preheated combustion air and vitiating hot flue gas.

17. The aparatus of claim 13 wherein the burner pair is of the direct firing type.

18. The apparatus of claim 13 wherein the burner pair is of the radiant tube type.

19. In a twinned pair of heat regenerative burners of the type including spaced-apart first and second burners having a regenertaive bed associated with each, adapted for installation on a furnace, wherein the improvement comprises, a. duct means communicating with a chamber of each of the burners; and b. nozzle means positioned within each of said burner chambers and aligned with said duct means adapted to selectively inject a gas stream into said duct means, whereby in use, a portion of a hot flue gas from said furnace is induced to enter said duct means and pass to one of said burners to vitiate a combustion process in said burner and thereby repress NOx formation.

* * * * *

UNITED STATES PATENT AND TRADEMARK OFFICE
CERTIFICATE OF CORRECTION

PATENT NO. : Reexamination Certificate No. B1 4,828,483
DATED : March 22, 1994
INVENTOR(S) : Harry P. Finke It is certified that error appears in the above-indentified patent and that said Letters Patent is hereby corrected as shown below:

Title page 2, under References Cited, FOREIGN PATENT DOCUMENTS, "44805 1/1977 Japan ." should read --44805 4/1977 Japan .--.

Title page 2, under References Cited, OTHER PUBLICATIONS, fourth reference, "Develoment" should read --Development--.

Claim 20 Line 4 Column 2 "existing" should read --exiting--.

Claim 25 Line 10 Column 3 "theregenerative" should read --the regenerative--.

Signed and Sealed this

Eighth Day of November, 1994

Attest:

BRUCE LEHMAN

*Attesting Officer*  *Commissioner of Patents and Trademarks*

REEXAMINATION CERTIFICATE (2249th)
United States Patent [19]
Finke

[11] B1 4,828,483
[45] Certificate Issued Mar. 22, 1994

[54] METHOD AND APPARATUS FOR SUPPRESSING NOX FORMATION IN REGENERATIVE BURNERS

[75] Inventor: Harry P. Finke, Pittsburgh, Pa.

[73] Assignee: Bloom Engineering Company, Inc., Pittsburgh, Pa.

Reexamination Request:
No. 90/002,830, Sep. 4, 1992

Reexamination Certificate for:
Patent No.: 4,828,483
Issued: May 9, 1989
Appl. No.: 198,739
Filed: May 25, 1988

[51] Int. Cl.$^5$ .............. F23D 11/44; F23L 15/00; F27D 17/00
[52] U.S. Cl. .............. 431/11; 431/181; 431/215; 432/28; 432/180
[58] Field of Search .............. 110/204, 205, 206, 207; 202/139, 141, 142, 151; 431/11, 5, 207, 328, 181, 215; 165/4; 432/28, 181, 182, 180

[56] References Cited

U.S. PATENT DOCUMENTS

| | | |
|---|---|---|
| 1,492,674 | 5/1924 | Chapman . |
| 1,814,567 | 7/1931 | Merkt . |
| 2,110,209 | 3/1938 | Engels ............... 158/1 |
| 2,188,133 | 1/1940 | Hepburn ............. 126/91 |
| 2,285,036 | 6/1942 | Kneass, Jr. ........... 263/43 |
| 2,346,991 | 4/1944 | Otto ................. 202/142 |
| 2,512,326 | 6/1950 | Harrison ............ 263/19 |
| 2,863,807 | 12/1958 | Van Ackeren ....... 202/142 |
| 3,146,821 | 9/1964 | Wuetig .............. 158/1 |
| 3,186,694 | 6/1965 | Beggs ................ 263/3 |
| 3,581,679 | 6/1971 | Jansen et al. ....... 107/63 |
| 3,760,776 | 9/1973 | Durrant ............. 122/459 |
| 3,801,267 | 4/1974 | Okuno et al. ....... 432/171 |
| 3,839,156 | 10/1974 | Jakobi et al. ....... 202/139 X |
| 3,880,570 | 4/1975 | Marshall ........... 431/4 |
| 3,920,382 | 11/1975 | Hovis et al. ....... 432/209 |
| 3,957,418 | 5/1976 | Sata ................. 431/9 |
| 3,994,665 | 11/1976 | Young ............... 431/116 |
| 4,004,875 | 1/1977 | Zink et al. ......... 431/9 |
| 4,030,874 | 6/1977 | Vollerin ............ 431/9 |
| 4,077,761 | 3/1978 | Dollinger et al. ... 431/8 |
| 4,100,741 | 7/1978 | Michels ............. 60/517 |
| 4,135,874 | 1/1979 | Tsuzi et al. ....... 431/115 |
| 4,218,211 | 8/1980 | Caplan .............. 432/219 |
| 4,338,074 | 7/1982 | Johansson ......... 431/6 |
| 4,355,973 | 10/1982 | Bailey .............. 432/54 |
| 4,357,134 | 11/1982 | Katsushige et al. . 431/9 |
| 4,424,754 | 1/1984 | Coleman et al. .... 110/190 |
| 4,439,137 | 3/1984 | Suzuki et al. ..... 431/8 |
| 4,445,843 | 5/1984 | Nutcher ............ 431/115 |
| 4,453,913 | 6/1984 | Gitman ............. 431/8 |
| 4,467,779 | 8/1984 | Kreinin et al. .... 126/91 |
| 4,493,309 | 1/1985 | Wedge et al. ..... 126/91 |
| 4,496,306 | 1/1985 | Okigami et al. ... 431/8 |
| 4,515,553 | 5/1985 | Morimoto et al. . 431/8 |
| 4,522,588 | 6/1985 | Todd et al. ....... 432/131 |
| 4,531,904 | 7/1985 | Sato et al. ........ 431/10 |
| 4,585,161 | 4/1986 | Kusama et al. .... 236/15 |
| 4,588,372 | 5/1986 | Torborg ............ 431/78 |
| 4,601,655 | 7/1986 | Riley et al. ....... 431/116 |
| 4,604,051 | 8/1986 | Davies et al. ..... 126/91 A X |
| 4,619,604 | 10/1986 | Pickering ......... 431/353 |
| 4,631,022 | 12/1986 | Ferri et al. ....... 431/90 |
| 4,645,450 | 2/1987 | West ................ 431/12 |
| 4,659,305 | 4/1987 | Nelson et al. ..... 431/9 |
| 4,673,348 | 6/1987 | Riley et al. ...... 431/115 |

(List continued on next page.)

FOREIGN PATENT DOCUMENTS

0141594 5/1985 European Pat. Off. .

(List continued on next page.)

*Primary Examiner*—Carl D. Price

[57] ABSTRACT

A method and apparatus for repressing NOx formation in twinned regenerative burner pairs includes inducing a stream of hot flue gas, preferably containing enriched products of combustion, from the main hot flue gas exhaust stream and vitiating the preheated combustion air with the hot flue gas in the firing burner. An interconnecting duct communicating with the twinned burner pair includes a coaxial gas nozzle for injecting a high kinetic energy gas stream into the exhausting hot flue gas to induce a portion of the hot flue gas into the interconnecting duct to pass the hot flue gas to the firing burner for vitiation purposes.

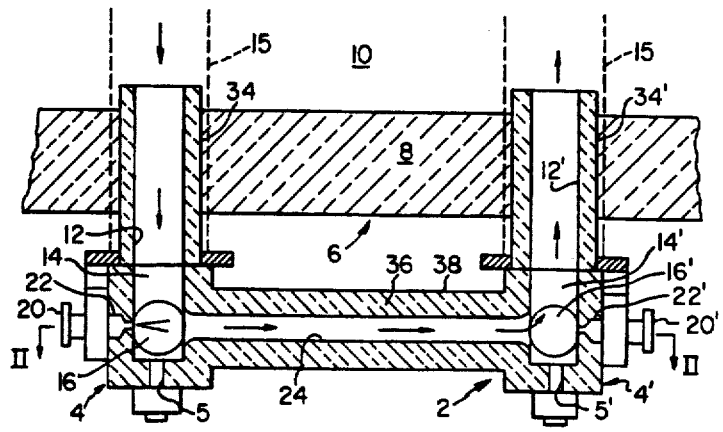

U.S. PATENT DOCUMENTS

| | | |
|---|---|---|
| 4,699,071 | 10/1987 | Vier et al. ............................. 110/345 |
| 4,728,282 | 3/1988 | May ....................................... 431/9 |
| 4,730,599 | 3/1988 | Kendall et al. ...................... 126/91 |
| 4,740,154 | 4/1988 | Cantoni ................................. 431/36 |
| 4,800,866 | 1/1989 | Finke ..................................... 126/91 |
| 4,856,492 | 8/1989 | Kawamoto ........................... 126/91 |
| 4,926,842 | 5/1990 | Watson et al. ............... 126/91 A X |
| 4,942,832 | 7/1990 | Finke ................................... 110/190 |

FOREIGN PATENT DOCUMENTS

| | | |
|---|---|---|
| 1090079 | 3/1955 | France . |
| 44805 | 1/1977 | Japan . |
| 50033 | 4/1977 | Japan . |
| 138728 | 11/1977 | Japan . |
| 53-69932 | 6/1978 | Japan . |
| 69932 | 6/1978 | Japan . |
| 60104 | 5/1980 | Japan . |
| 12904 | 7/1981 | Japan . |
| 16107 | 1/1983 | Japan . |
| 16108 | 1/1983 | Japan . |
| 17364 | 2/1983 | Japan . |
| 154311 | 9/1983 | Japan . |
| 43061 | 3/1986 | Japan . |
| 926429 | 4/1980 | U.S.S.R. . |
| 968345 | 9/1964 | United Kingdom . |
| 2036940 | 7/1980 | United Kingdom ................ 431/215 |
| 2081433 | 2/1982 | United Kingdom . |
| 2170584 | 8/1986 | United Kingdom . |
| 2170585 | 8/1986 | United Kingdom . |
| 2190515 | 11/1987 | United Kingdom ................ 110/204 |

OTHER PUBLICATIONS

Douspis, M. Michel; "Une utilisation rationnelle de l'energie: le tube radiant a gas"; pp. 395–400.

McGannon, Harold E. (Ed.); "The Making, Shaping and Treating of Steel"; Published by United States Steel; pp. 140–141.

SRG Low NOx Burner Forced Draft-Low Excess Air Series; Coen Company.

Develoment of the Low-NOx Burner for Oil Fired 400 t/h Boiler; Kawasaki.

Profit from NOx Control; Process Combustion Corporation.

Hemsath, Klaus H., Thomas J. Schultz and Dennis A. Chojnacki; "Investigation of NOx Emissions from Industrial Burners"; Presented At The First American Flame Days Chicago; Sep. 6 and 7, 1972.

Crawford, A. R., E. H. Manny, M. W. Gregory and W. Bartok; "The Effect of Combustion Modification on Pollutants and Equipment Performance of Power Generation Equipment"; 1975.

Bartok, W., A. R. Crawford, G. J. Piegari; "Systematic Investigation of Nitrogen Oxide Emissions and Combustion Control Methods for Power Plant Boilers"; Atlantic City, Aug. 29, 1971.

New Hi-Performance Lo-NOx Burners; National Air-Oil Burner Company, Inc.

The John Zink LoNox Burners; Opposition 67,029; Exhibit 4.

Burner Design Parameters for Flue Gas NOx Control; The John Zink Company; Opposition 67,029; Exhibit 18.

Reduce Heater NOx in the Burner; Hydrocarbon Processing; Nov., 1982.

Lo-NOx Burners reduce nitrogen oxides to acceptable levels; Flare Tips; vol. 1, No. 4; Summer, 1983.

Low NOx Burners Metallurgical and Process Furnaces; Bloom Engineering Company, Inc.; Jul. 30, 1985.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 3-12 and 14-19 are cancelled.

Claims 2 and 13 are determined to be patentable as amended.

New claims 20-28 are added and determined to be patentable.

2. A method of repressing NOx formation in a twinned pair of regenerative burners *communicating with a radiant tube extending into and exiting from a furnace* and of the type having heat regeneration beds associated therewith for alternately withdrawing heat from a flue gas exiting [a furnace] *the radiant tube* and heating a combustion air stream being fed therethrough, comprising the steps of:
    withdrawing a stream of hot flue gas from the [furnace] *radiant tube;*
    injecting a stream of gas *separate from the combustion air stream* into said flue gas stream;
    entraining a portion of said hot flue gas within said injected gas stream;
    passing said stream of injected gas and said entrained portion of hot flue gas to a burner chamber; and
    vitiating a combustion process in said burner chamber with said portion of hot flue gas whereby NOx formation is repressed.

13. An improved regenerative burner apparatus of the type comprising a pair of first and second spaced-apart burners, each of said burners comprising a chamber for mixing a fuel and a stream of preheated combustion air supplied from a regenerative heat storage bed associated with each of said burners, said burners adapted to operate cyclically wherein a first of said burners is in a firing mode directing hot gases into a furnace interior while a flue gas stream exits the furnace and passes through the second burner chamber and then passes to the regenerative heat storage bed associated therewith said second burner, wherein the improvement comprises [,]:
    *a radiant tube extending into the furnace interior and communicating with each of the first and second burners;*
    an interconnecting duct communicating with the chambers of said first and second burners; and
    nozzle means adapted to inject a gas stream *separate from the combustion air stream* for inducing a flow of a portion of the hot flue gas exiting the [furnace] *radiant tube* into said interconnecting duct to enter the burner in the firing mode to vitiate the combustion air therein, whereby NOx formation *within the radiant tube* is repressed.

*20. A method of repressing NOx formation in a twinned pair of regenerative burners of the type having heat regeneration beds associated therewith for alternately withdrawing heat from a flue gas existing a furnace and heating a combustion air stream being fed therethrough, comprising the steps of:*
    *withdrawing a stream of hot flue gas from the furnace;*
    *injecting a stream of gas into said flue gas stream;*
    *aligning the injected gas stream in a tangential direction relative to said hot flue gas stream whereby a swirling motion is imparted to the flue gas to create an enriched layer of products of combustion in said hot flue gas for entraining a portion of said hot flue gas within said injected gas stream;*
    *passing said stream of injected gas and said entrained portion of hot flue gas to a burner chamber; and*
    *vitiating a combustion process in said burner chamber with said portion of hot flue gas whereby NOx formation is repressed.*

*21. A method of repressing NOx formation in a twinned pair of regenerative burners of the type having heat regeneration beds associated therewith for alternately withdrawing heat from a flue gas exiting a furnace and heating a combustion air stream being fed therethrough, comprising the steps of:*
    *withdrawing a stream of hot flue gas from the furnace;*
    *injecting a stream of gas into said flue gas stream, wherein the injected gas stream is flue gas containing products of combustion;*
    *entraining a portion of said hot flue gas within said injected gas stream;*
    *passing said stream of injected gas and said entrained portion of hot flue gas to a burner chamber; and*
    *vitiating a combustion process in said burner chamber with said portion of hot flue gas whereby NOx formation is repressed.*

*22. A method of operating a heat regenerative burner pair operably connected to a furnace, comprising the steps of:*
    *(a) withdrawing a stream of hot flue gas from the furnace;*
    *(b) inducing a portion of the hot flue gas to flow to a first of said burner pair when said first burner is in a firing mode, said inducing step comprising injecting a high velocity gas stream tangentially into said hot flue gas stream whereby said injected stream possesses sufficient kinetic energy to flow to said firing burner;*
    *(c) flowing a balance of said hot flue gas through a first regenerative bed associated with the second of said burner pair when said second burner is in an exhaust mode;*
    *(d) preheating a combustion air stream in a second regenerative bed associated with said first burner;*
    *(e) vitiating said preheated combustion air with said portion of said induced portion of hot flue gas in said first burner;*
    *(f) whereby upon introduction of a fuel, a resulting combustion process taking place contains a repressed NOx level; and*
    *cycling said process steps of (a)-(f) to said second burner wherein said second burner is in a firing mode and said first burner is in an exhaust mode.*

*23. The method of claim 22 wherein the injected high velocity gas stream is one selected from the group consisting of air, flue gas, gaseous fuel and mixtures of two or more thereof.*

*24. The method of claim 22 wherein the injected high velocity gas stream is flue gas.*

25. An improved regenerative burner apparatus of the type comprising a pair of first and second spaced-apart burners, each of said burners comprising a chamber for mixing a fuel and a stream of preheated combustion air supplied from a regenerative heat storage bed associated with each of said burners, said burners adapted to operate cyclically, wherein a first of said burners is in a firing mode directing hot gases into a furnace interior while a flue gas stream exits the furnace and passes through the second burner chamber and then passes to theregenerative heat storage bed associated therewith said second burner, wherein the improvement comprises, an interconnecting duct communicating with the chambers of said first and second burners; and nozzle means adapted to inject a gas stream for inducing a flow of a portion of the hot flue gas exiting the furnace into said interconnecting duct to enter the burner in the firing mode to vitiate the combustion air therein, whereby NOx formation is repressed;

said nozzle means including a nozzle associated with each of said burner chambers, each nozzle having an orifice aligned substantially coaxially with said interconnecting duct.

26. The apparatus of claim 25 wherein the interconnecting duct is aligned tangentially relative to each of said burner chambers to impart a swirling motion in said hot flue gas whereby a layer of highly enriched products of combustion gas is entrained in said gas stream.

27. The apparatus of claim 25 wherein each of said burner chambers includes a plurality of fuel inlet nozzles arranged tangentially relative to a bore of said chamber whereby a swirling motion is imparted to gases flowing therein to improve mix of the fuel, preheated combustion air and vitiating hot flue gas.

28. A method of repressing NOx formation in a twinned pair of regenerative burners of the type having heat regeneration beds associated therewith for alternately withdrawing heat from a flue gas exiting a furnace and heating a combustion air stream being fed therethrough, comprising the steps of:

withdrawing a stream of hot flue gas from the furnace;

injecting a stream of gas separate from the combustion air stream into said flue gas stream, said injected gas stream being one selected from the group consisting of flue gas containing products of combustion, gaseous fuel, and mixtures thereof;

entraining a portion of said hot flue gas within said injected gas stream;

passing said stream of injected gas and said entrained portion of hot flue gas to a burner chamber; and vitiating a combustion process in said burner chamber with said portion of hot flue gas whereby NOx formation is repressed.

* * * * *